United States Patent
Ritts et al.

(10) Patent No.: US 7,237,749 B2
(45) Date of Patent: Jul. 3, 2007

(54) COLLAPSIBLE MOBILE PLATFORM INTERIOR STRUCTURE

(75) Inventors: Michael A Ritts, Anacortes, WA (US); Gregory W Davidson, Stanwood, WA (US); Christopher J Mills, Everett, WA (US)

(73) Assignee: The Boeing Company, Chicago, IL (US)

( * ) Notice: Subject to any disclaimer, the term of this patent is extended or adjusted under 35 U.S.C. 154(b) by 160 days.

(21) Appl. No.: 11/011,796

(22) Filed: Dec. 14, 2004

(65) Prior Publication Data
US 2006/0124802 A1    Jun. 15, 2006

(51) Int. Cl.
  *B64D 11/00* (2006.01)
  *B64D 13/00* (2006.01)
(52) U.S. Cl. .............................. 244/118.5; 244/118.2; 244/117 R; 244/159.5
(58) Field of Classification Search ........... 244/117 R, 244/118.1, 118.2, 118.5, 118.6, 119, 131; 52/79.5, 79.6, 79.1, 474, 641; 114/71, 189; 105/314–317, 319; 296/24.3, 24.31, 156, 296/160, 159, 165; 135/143, 148, 157, 116, 135/122, 128; 220/668, 6, 4.28, 1.5
See application file for complete search history.

(56) References Cited

U.S. PATENT DOCUMENTS

| | | | | |
|---|---|---|---|---|
| 80,301 A | * | 7/1868 | Munson | 52/3 |
| 533,031 A | * | 1/1895 | Breed | 105/317 |
| 582,229 A | * | 5/1897 | Reynolds | 224/432 |
| 1,170,188 A | * | 2/1916 | Brown | 135/149 |
| 1,232,168 A | * | 7/1917 | Aronson | 52/641 |
| 1,412,694 A | * | 4/1922 | Loughran | 220/6 |
| 2,332,652 A | * | 10/1943 | Mackenzie | 217/16 |
| 2,350,904 A | * | 6/1944 | King | 52/64 |
| 2,352,296 A | * | 6/1944 | Szego | 114/83 |
| 2,376,695 A | * | 5/1945 | Hill | 52/64 |
| 2,459,445 A | * | 1/1949 | McClintock et al. | 5/98.3 |
| 2,549,816 A | * | 4/1951 | Johnson | 52/641 |
| 3,009,212 A | * | 11/1961 | Makens | 52/66 |
| 3,407,548 A | * | 10/1968 | Russell | 52/58 |
| 3,517,849 A | * | 6/1970 | Presnick | 220/4.28 |
| 3,527,339 A | * | 9/1970 | Cipolla | 206/290 |
| 3,587,903 A | * | 6/1971 | Rustin, Jr. | 217/48 |

(Continued)

*Primary Examiner*—Timothy D. Collins
*Assistant Examiner*—Joshua Michener
(74) *Attorney, Agent, or Firm*—Harness, Dickey & Pierce, P.L.C.

(57) ABSTRACT

An interior structure for a mobile platform is provided. The interior structure is constructed of a lightweight collapsible frame that can be reconfigured from a compact, substantially flat collapsed state to a non-compact, substantially sprawling expanded state. In the expanded state, the collapsible frame provides at least a portion of a structural load bearing frame for the interior structure. The interior structure additionally includes a plurality of interchangeable panels that attach to the collapsible frame to form interior surfaces of the structure. The panels form such things as the interior wall, ceiling and floor surfaces and can also include amenities such as shelves, lights, beds, closets, electrical outlets, Internet connections and entertainment equipment. The interior structure can be carried though the typical man-door of a mobile platform. Thus, the interior structure can be installed after the outer structure of the mobile platform has been assembled and just as easily be removed at a later time by merely removing the interchangeable panels, collapsing the collapsible frame and carrying the panels and frame out though the man-door.

16 Claims, 6 Drawing Sheets

U.S. PATENT DOCUMENTS

| | | | | |
|---|---|---|---|---|
| 3,908,564 | A | * | 9/1975 | Miller et al. ................ 108/162 |
| 3,955,845 | A | * | 5/1976 | Werner ........................ 296/10 |
| 4,066,227 | A | | 1/1978 | Buchsel ................... 244/118 P |
| 4,120,417 | A | * | 10/1978 | Aquino .......................... 220/6 |
| 4,240,356 | A | * | 12/1980 | Nagy ......................... 105/323 |
| 4,272,930 | A | * | 6/1981 | Foster ........................ 52/79.1 |
| 4,527,362 | A | * | 7/1985 | Tobey et al. .................. 52/71 |
| 4,589,612 | A | * | 5/1986 | Halim ..................... 244/118.6 |
| 4,597,549 | A | * | 7/1986 | Ryan ...................... 244/118.5 |
| 4,693,387 | A | * | 9/1987 | Stonier .......................... 220/6 |
| 4,726,157 | A | * | 2/1988 | Hult et al. ................... 52/79.5 |
| 4,726,486 | A | * | 2/1988 | Masuda ....................... 220/1.5 |
| 4,819,285 | A | * | 4/1989 | Fetters ......................... 5/99.1 |
| 4,836,395 | A | * | 6/1989 | Goutille ....................... 220/1.5 |
| 4,854,245 | A | * | 8/1989 | Platzer ....................... 105/317 |
| 4,856,838 | A | * | 8/1989 | Reshke et al. ................ 296/14 |
| 4,970,841 | A | * | 11/1990 | Zeigler ........................ 52/646 |
| 5,016,418 | A | * | 5/1991 | Rhodes et al. ................ 52/646 |
| 5,028,088 | A | * | 7/1991 | Del Monico et al. .... 296/26.04 |
| 5,050,353 | A | * | 9/1991 | Rogers et al. ................... 52/8 |
| 5,056,667 | A | * | 10/1991 | Coogan ....................... 206/600 |
| 5,115,999 | A | | 5/1992 | Buchsel et al. .......... 244/118.5 |
| 5,125,206 | A | * | 6/1992 | Motohashi et al. ........... 52/646 |
| 5,243,718 | A | * | 9/1993 | Shamie ......................... 5/99.1 |
| 5,253,763 | A | * | 10/1993 | Kirkley et al. .............. 206/600 |
| 5,314,143 | A | | 5/1994 | Luria ....................... 244/118.1 |
| 5,333,421 | A | * | 8/1994 | McKenna ....................... 52/86 |
| 5,657,583 | A | * | 8/1997 | Tennant ....................... 52/79.5 |
| 5,784,836 | A | * | 7/1998 | Ehrick ........................ 52/79.8 |
| 5,890,612 | A | * | 4/1999 | Coppi ............................ 220/7 |
| 5,904,262 | A | * | 5/1999 | Coppi ............................ 220/7 |
| 6,007,025 | A | * | 12/1999 | Coughren et al. ........ 244/118.6 |
| 6,073,883 | A | | 6/2000 | Ohlmann et al. ........ 244/118.5 |
| 6,079,669 | A | * | 6/2000 | Hanay et al. ............. 244/118.5 |
| 6,182,926 | B1 | * | 2/2001 | Moore ..................... 244/118.5 |
| 6,202,884 | B1 | * | 3/2001 | Verkerke .................... 220/530 |
| 6,422,409 | B2 | * | 7/2002 | Kofod ............................ 220/7 |
| 6,467,221 | B1 | * | 10/2002 | Bigelow ..................... 52/2.17 |
| 6,604,709 | B1 | * | 8/2003 | Wentland et al. ........ 244/118.5 |
| 6,615,421 | B2 | * | 9/2003 | Itakura ........................... 4/664 |
| 6,848,654 | B1 | * | 2/2005 | Mills et al. ............. 244/118.5 |
| 6,932,298 | B1 | * | 8/2005 | Mills ....................... 244/118.5 |
| 6,971,608 | B2 | * | 12/2005 | Harrington et al. ...... 244/118.5 |
| 7,044,083 | B2 | * | 5/2006 | Farmer et al. .............. 119/474 |
| 2001/0020631 | A1 | * | 9/2001 | Spykerman et al. ........ 224/539 |
| 2004/0168714 | A1 | * | 9/2004 | Zheng ......................... 135/87 |
| 2005/0145192 | A1 | * | 7/2005 | Axelrod et al. ............. 119/499 |
| 2006/0006175 | A1 | * | 1/2006 | Carola ........................... 220/6 |

* cited by examiner

COLLAPSIBLE MOBILE PLATFORM INTERIOR STRUCTURE

FIELD OF INVENTION

The present invention relates to interior structures of a mobile platform and more particularly to a collapsible mobile platform interior structure.

BACKGROUND OF THE INVENTION

Installation of mobile platform interior structures is generally very time consuming, labor intensive and costly. For example, structures, such as galleys, lavatories, or privacy cabins are typically installed in the interior areas of a mobile platform, such as a bus, train, ship or aircraft as monolithic, one piece, pre-assembled structures prior to body join of the mobile platform. Such installation generally requires the implementation of heavy moving equipment to lift and move the monolithic structures into place so that the structures can be connected to the mobile platform, e.g. connected to the mobile platform structural framework. Additionally, the typical one-piece, pre-assembled structures cannot be easily removed when necessary to upgrade or repair the structure or to inspect areas of the mobile platform concealed by the structure.

Therefore, it is desirable to provide a mobile platform interior structure constructed to allow the structure to be easily installed after body join of the mobile platform and likewise easily removed at a later time.

BRIEF SUMMARY OF THE INVENTION

In a preferred embodiment of the present invention, an interior structure for a mobile platform is provided. The interior structure can be any furnishing, monument or commodity, such as, a galley, lavatory, or privacy cabin for passengers or crew members. The interior structure is constructed of a lightweight collapsible frame that can be reconfigured from a compact, substantially flat collapsed state to a non-compact, substantially sprawling expanded state. In the expanded state, the collapsible frame provides at least a portion of a structural load bearing frame for the interior structure. More specifically, in the expanded state, the collapsible frame forms truss-like framework walls of the interior structure. The interior structure additionally includes a cross beam that is coupled at opposing ends to bottom rails of the framework walls once the collapsible frame is in the expanded state. Furthermore, the interior structure includes a plurality of interchangeable panels that attach to the collapsible frame to form interior surfaces of the structure. The panels form such things as the interior wall, ceiling and floor surfaces. The panels can also include amenities such as shelves, lights, beds, closets, electrical outlets, Internet connections and entertainment equipment. Thus, the interior structure can be carried though the typical man-door of a mobile platform and installed after the outer structure of the mobile platform, e.g. fuselage or body, has been assembled. Furthermore, the interior structure can be easily removed by removing the interchangeable panels, collapsing the collapsible frame and carrying the panels and frame out though the man-door.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention. Furthermore, the features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

Figure 1:
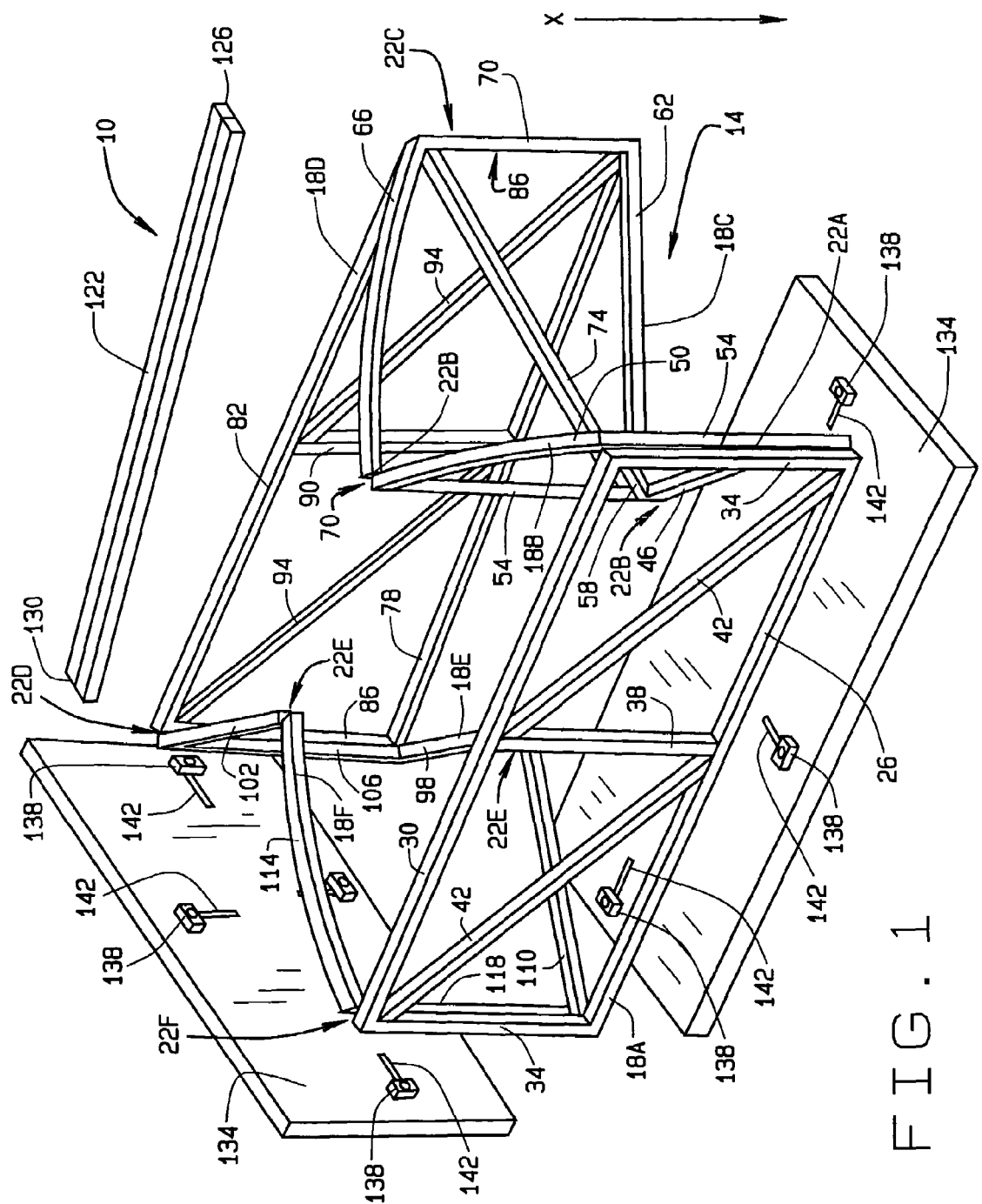
FIG. 1 is an exploded isometric view of a mobile platform interior structure including a collapsible frame in a semi-expanded state, in accordance with a preferred embodiment of the present invention.
Figure 2:
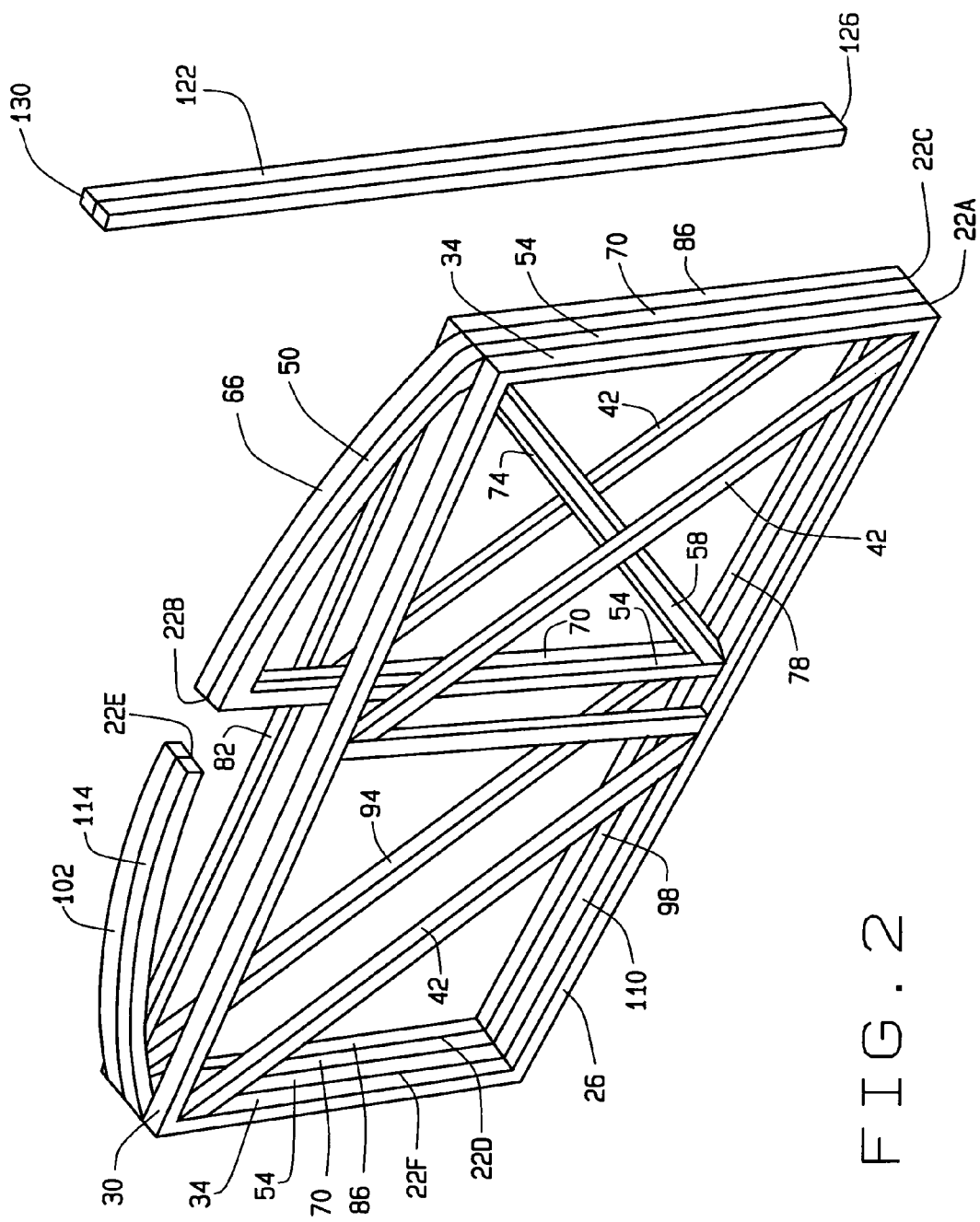
FIG. 2 is an isometric view of the collapsible frame shown in FIG. 1, in a collapsed state.

Referring to FIGS. 1 and 2, an interior structure 10 of a mobile platform is illustrated. Although the mobile platform is exemplarily illustrated as an aircraft throughout FIG. 1–6, it should be appreciated that the present invention is applicable for implementation in any mobile platform, including but not limited to a bus, ship, train or aircraft. The interior structure 10 can be any structure installed in the interior of a mobile platform. For example, the interior structure 10 can be a galley, lavatory, privacy cabin for passengers or crew, an elevator shaft or storage bin. The structure 10 includes a lightweight collapsible frame 14 constructed of any lightweight material suitable for use in fabricating load bearing structures, for example aluminum or titanium. The collapsible frame 14 includes a plurality of hingedly connected sections 18, identified in FIG. 1 as sections 18A through 18F. Particularly, side section 18A is hingedly connected to end section 18B along joint 22A; end section 18C is hingedly connected to end section 18B along joints 22B; side section 18D is hingedly connected to end sections 18C and 18E along joints 22C and 22D, respectively; and end section 18F is hingedly connected to end section 18E and side section 18A along joints 22E and 22F, respectively. The sections 18 can be hingedly connected using any suitable hinge device, such as a piano hinge, butt hinge, barrel hinge, flush hinge or butterfly hinge.

Via the hinged sections 18, the collapsible frame 14 can be configured such that the sections 18 are folded together to place the collapsible frame 14 in a compact, substantially flat collapsed state, as illustrated in FIG. 2. This allows the lightweight collapsible frame 14 to be easily carried from one location to another, where the collapsible frame can be reconfigured to a non-compact, substantially sprawling expanded state, as illustrated in FIG. 1.

In a preferred embodiment, the side section 18A includes a bottom rail 26, a top rail 30 a pair of end rails 34, an intermediate rail 38 and racking rails 42, thereby forming a truss-like structure. The end section 18B includes a bottom rail 46, a top rail 50, a pair of end rails 54 and a racking rail 58, thereby forming a truss-like structure. Similarly, the end section 18C includes a bottom rail 62, a top rail 66, a pair of end rails 70 and a racking rail 74, thereby forming a truss-like structure. The side section 18D includes a bottom rail 78, a top rail 82 a pair of end rails 86, an intermediate rail 90 and racking rails 94, thereby forming a truss-like structure. The end sections 18E and 18F respectively include bottom rails 98 and 110, top rails 102 and 114 and end rails 106 and 118. In the exemplary embodiment illustrated in FIG. 1, the end sections 18E and 18F are adapted to connect to another mobile platform interior structure and therefore do not include a second end rail or racking rails. For example, the collapsible frame 14 could be connected to the collapsible frame 14 of an adjacent interior structure 10. Thus, any load bearing support necessary at end sections 18E and 18F is provided by the adjoining interior structure 10 to which the end sections 18E and 18F are connected. Alternatively, interior structure 10 could be a stand-alone structure, in which case the end sections 18E and 18F would each include a second end rail 106 and 118, respectively, and a racking rail similar to racking rails 58 and 74 of end sections 18B and 18C.

Additionally, it should be understood that the sections 18A, 18B, 18C and 18D are not limited to the exemplary configurations of bottom, top, end, intermediate and racking rails 26 through 94, as shown in FIG. 1, but could have any configuration that form a truss-like structure capable of supporting a substantial load in the vertical direction X. For example, in a preferred embodiment, wherein the collapsible frame 14 is utilized to construct a mobile platform two-person overhead privacy cabin, hung from the overhead structure of the mobile platform fuselage or cabin, the collapsible frame 14 may support up to 700 pounds. In other implementations, the collapsible frame 14 can be suitably constructed to support loads in the X direction of more or less than 700 pounds depending on the particular application. For example, if the interior structure 10 is implemented as a galley and connected to the floor structure of the mobile platform, the collapsible frame 14 may constructed to support less of a load, e.g. 300 pounds, while if the collapsible frame 14 is utilized to construct a four-person overhead privacy cabin, the collapsible frame 14 may be constructed to support a considerably larger load, e.g. 1400 pounds or more.

In a preferred embodiment, the interior structure 10, additionally includes a cross beam 122 that is coupled at opposing ends 126 and 130 to opposing bottom rails 26 and 78. Alternatively, the cross beam 122 could be coupled to opposing bottom rails 62 and 98 or 46 and 110. In instances where the collapsible frame 14 is connected to the floor structure of the mobile platform, the cross beam may not be implemented.

The interior structure 10 further includes a plurality of panels 134 that attach to the collapsible frame 14, once the collapsible frame 14 is in the expanded position, to form interior surfaces of the interior structure 10. Alternatively, the panels 134 can be attached to the collapsible frame 14 to form exterior surfaces of the interior structure 10. The panels 134 are attached to the collapsible frame 14, in the expanded state, using connectors 138 that can be any suitable connecting device such as spring clips, rivets, nut and bolt devices, quick pins or snaps. In a preferred embodiment, the panels 134 are self-indexing such that the connectors can be adjusted or located in various positions on each panel 134 to all the panels to be interchangeable and mount to various locations of the collapsible frame 14. In an exemplary embodiment, the panels 134 include indexing guides 142 to which the connectors 138 are slideably connected. The connectors 134 can be slid along the guides 142 to reposition the connectors 134 in the appropriate locations to mount the panels 134 at any desired location on the collapsible frame 14.

Figure 6:
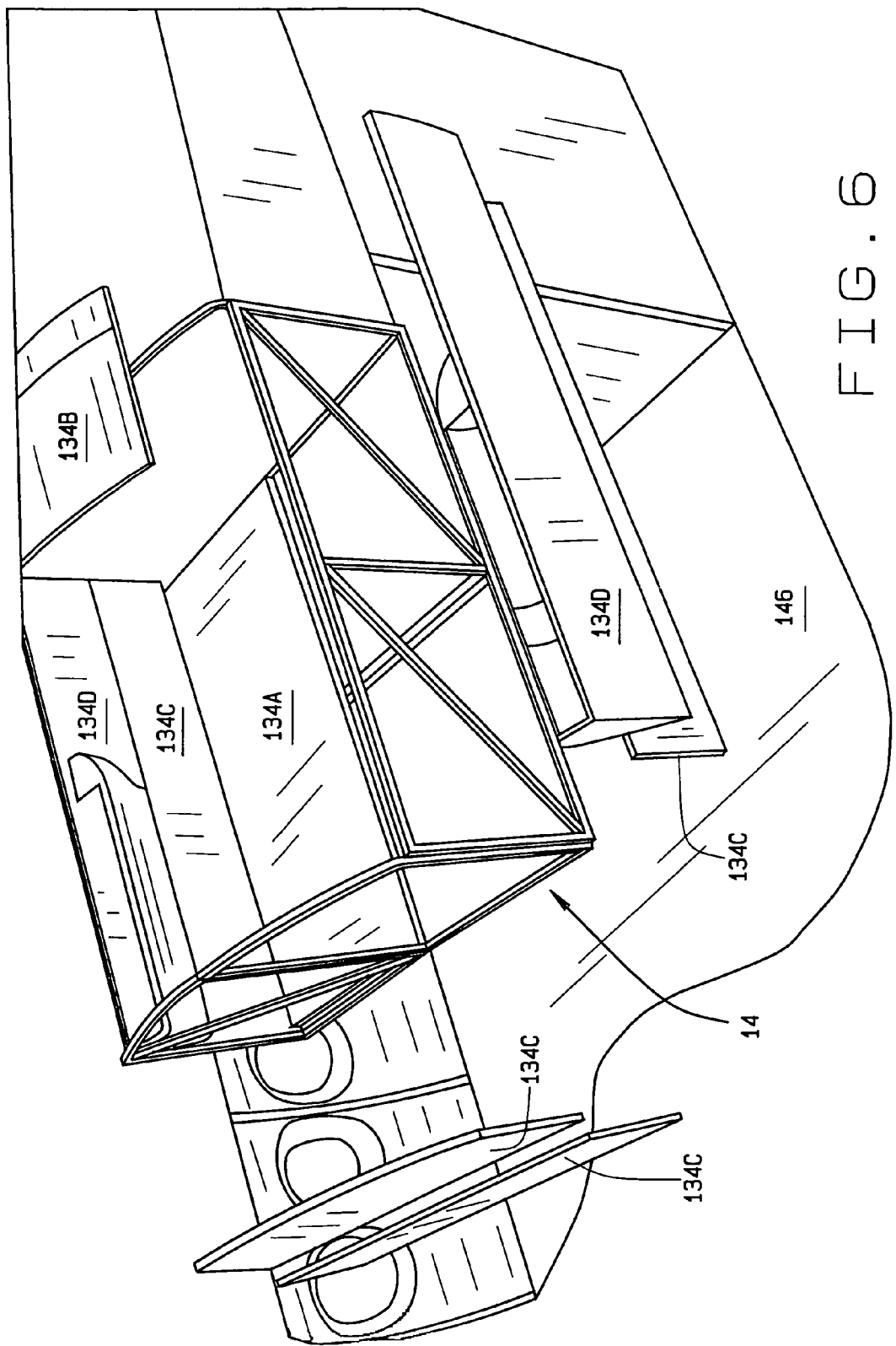
FIG. 6 is a cut-away view of the mobile platform fuselage illustrating the collapsible frame shown in FIG. 1 in a fully expanded state and a plurality of panels that attach to the collapsible frame to form interior surfaces of the interior structure.

Referring to FIGS. 6 and 7, the panels 134 can have many different shapes and sizes and include various amenities or furnishings as desired in accordance with the implementation of the interior structure 10. For example, if the interior structure 10 is implemented as an overhead privacy cabin, as shown in FIGS. 6 and 7, the panels 134 could include floor panels 134A, ceiling panels 134B, wall panels 134C and amenity or furnishing panels 134D. As described above, the panels 134 can be attached to the interior and/or the exterior sides of the collapsible frame 14 to provide interior and/or exterior surfaces of the mobile platform interior structure 10. The furnishing panels 134D can include any desirable amenity or furnishing such as cabinets, storage bins, shelves, lights, closets, electrical outlets, Internet connections and entertainment equipment.

Figure 3:
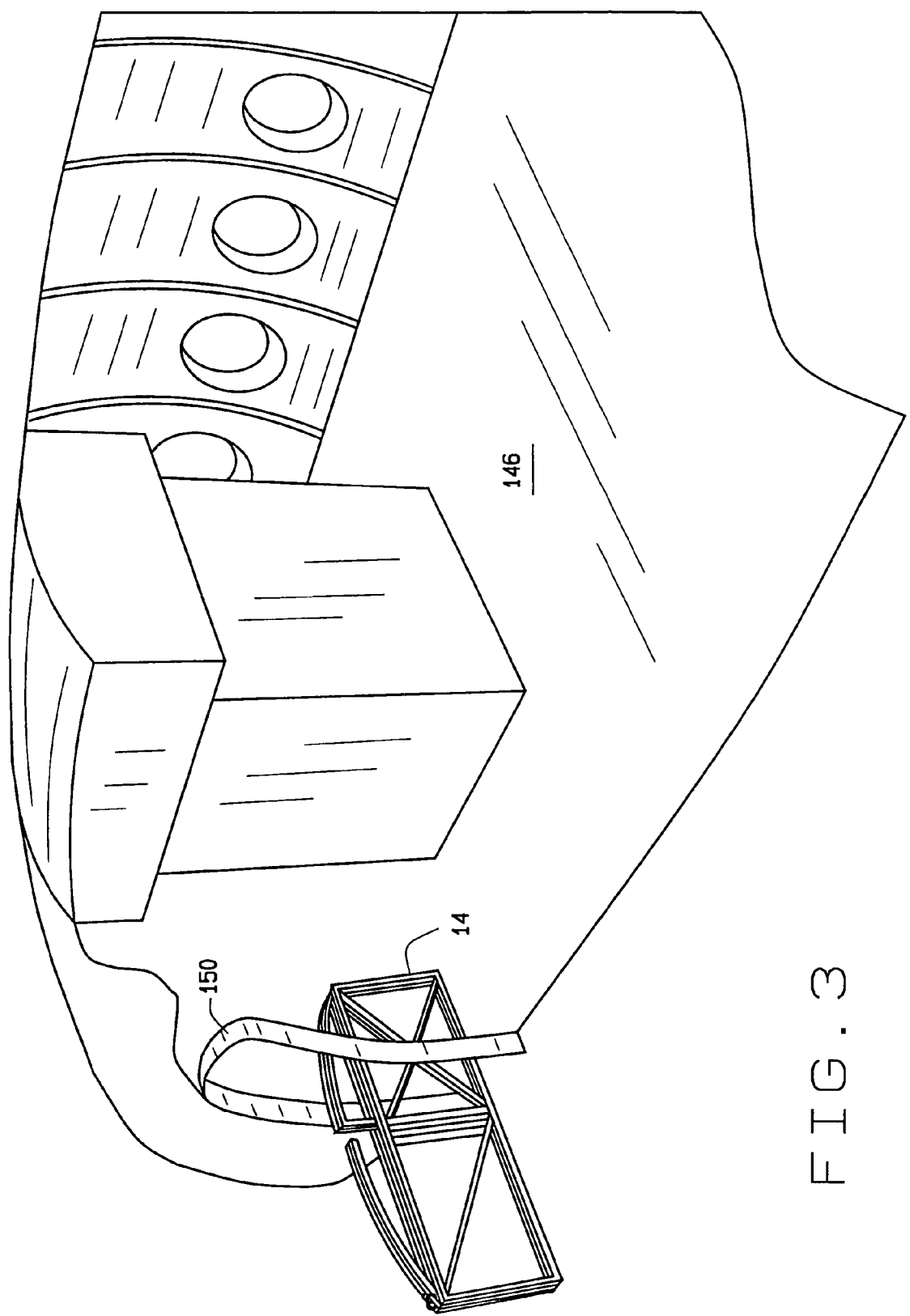
FIG. 3 is a cut-away view of a mobile platform fuselage illustrating that the collapsible frame shown in FIG. 1 can be carried through a man-door of the mobile platform.
Figure 4:
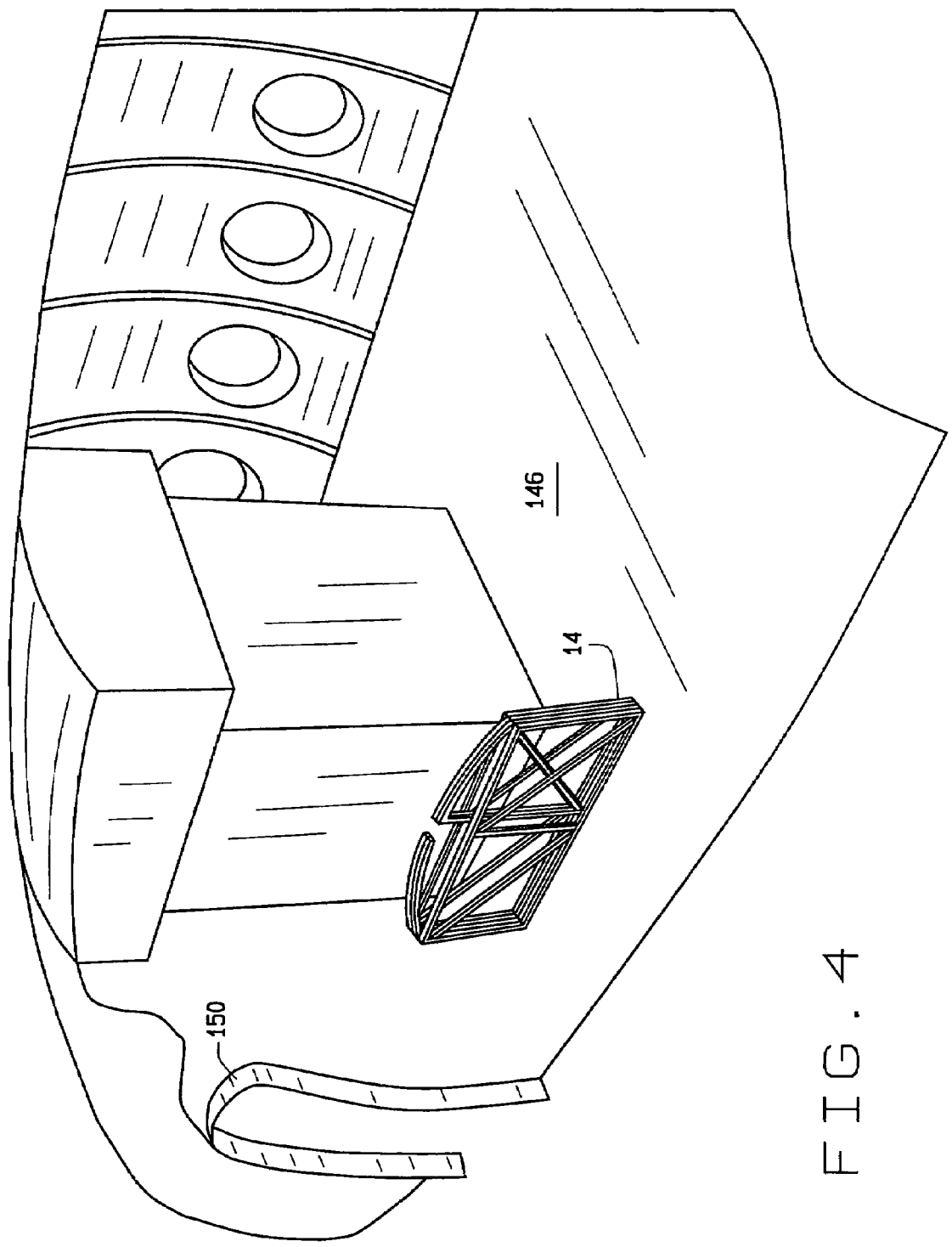
FIG. 4 is a cut-away view of the mobile platform fuselage illustrating that the collapsible frame shown in FIG. 1 can be carried through an aisle or passage way of the mobile platform.

Referring to FIGS. 3, 4, 5 and 6, to install the interior structure 10, shown in FIG. 1, the collapsible frame 14, in the collapsed state, is carried into an interior area 146 of the mobile platform, as illustrated in FIG. 3. More particularly, the lightweight nature and compact, substantially flat form of the collapsible frame 14 in the collapsed state allows the collapsible frame 14 to be easily carried and manipulated through a man-door 150 by one or two people without the aid of heavy moving or lifting equipment. As used herein, the man-door 150 is understood to mean a passage or doorway used by passengers and crew of the mobile platform for typical ingress and egress of the mobile platform, as opposed to a larger cargo door used for loading and unloading large cargo. Thus, in the collapsed state, the sections 18 of the collapsible frame 14 are folded together such that the collapsible frame will easily fit through a door or passageway sized merely for human ingress and egress of the mobile platform. Additionally, the lightweight nature and compact, substantially flat form of the collapsible frame 14 in the collapsed state allows the collapsible frame 14 to be easily carried and manipulated by one or two persons throughout the interior area 146 of the mobile platform without the aid of heavy moving or lifting equipment, as illustrated in FIG. 4. The panels 134 and cross beam 122 are also sized to be easily carried and manipulated through the man-door 150 and throughout the interior area 146 without the aid of heavy moving or lifting equipment.

Figure 5:
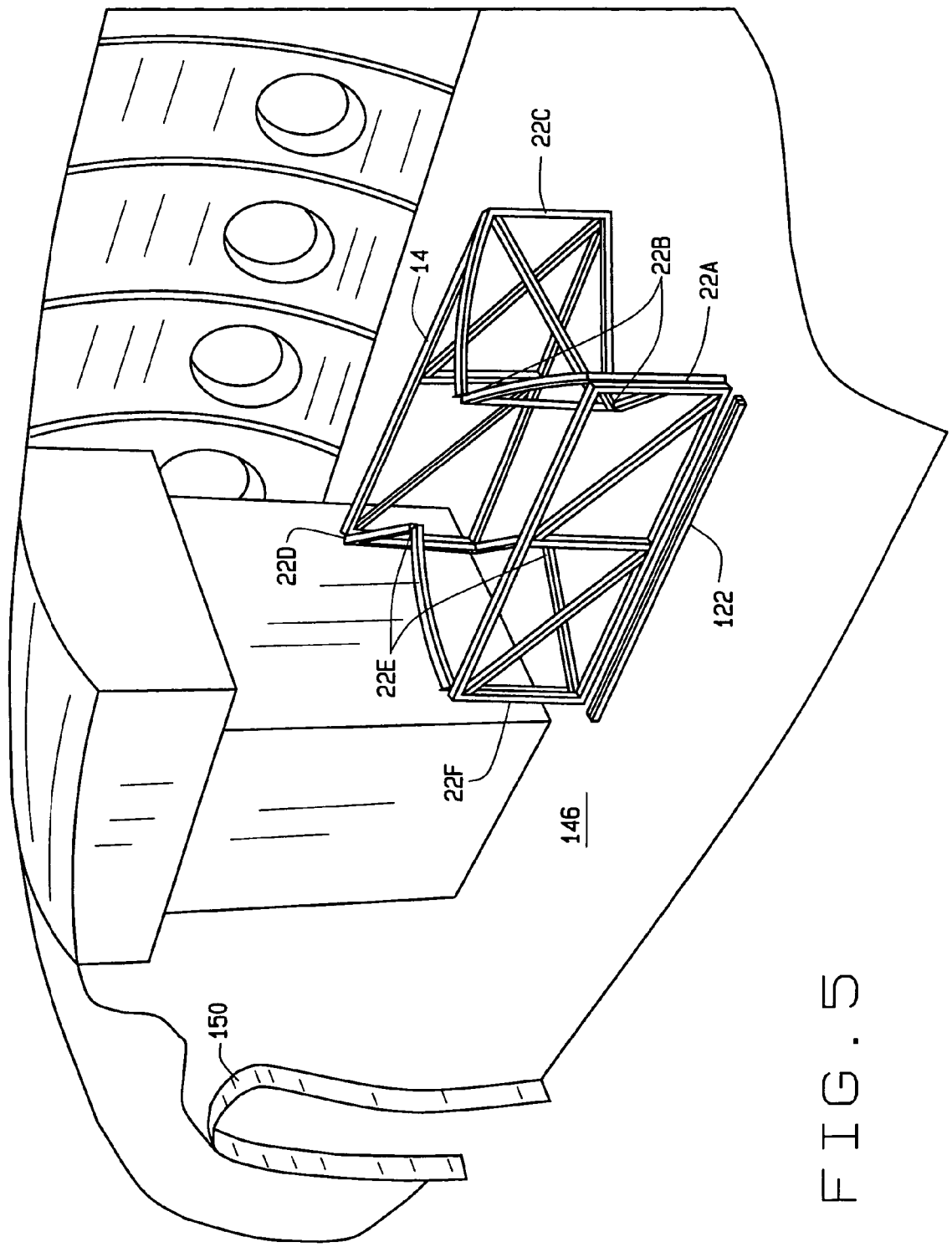
FIG. 5 is a cut-away view of the mobile platform fuselage illustrating that the collapsible frame shown in FIG. 1 can be opened or expanded within the mobile platform fuselage.

Once the collapsible frame 14 has been carried into the mobile platform interior area 146, the collapsible frame 14 can be unfolded or expanded into the expanded state, as illustrated in FIG. 5. FIG. 5 illustrates the collapsible frame 14 in a partially expanded, or semi-expanded state to clearly illustrate how the collapsible frame 14 is folded and unfolded at the hinged joints 22A through 22F to place the collapsible frame 14 in either the collapsed or expanded states. After the collapsible frame 14 is placed in the fully expanded state, if necessary, depending on the implementation of the interior structure 10, the cross beam is connected between opposing bottom rails, as described above. The fully expanded collapsible frame 14 can then be placed in the desired location within the interior area 146 and connected to the mobile platform. Preferably, the collapsible frame 14 is connected, i.e. anchored, to structural components of the mobile platform, such a floor joists, side beams or ceiling trusses. The collapsible frame 14 can be connected to the mobile platform using any suitable connection device. For example the collapsible frame 14 can be bolted, welded, riveted or pinned, e.g. quick pinned, to the mobile platform.

If implementation of the interior structure 10 requires that the collapsible frame 14 be lifted and connected to overhead components, e.g. ceiling trusses or beams, of the mobile platform, as illustrated in FIG. 6, the lightweight nature of the collapsible frame 14 allows it to be lifted and positioned by one or two persons without the use of heavy lifting machinery.

Although the collapsible frame 14 has been illustrated and described above as forming the entire load bearing framework of the interior structure 10, in an alternative preferred embodiment, the collapsible frame 14 comprises only a portion of the load bearing frame work. More specifically, for larger interior structures 14, two or more collapsible frames 14 could be connected together to form the entire load bearing framework of the interior structure 10. The completed framework would then be connected to the mobile platform and the panels 134 would be attached to the framework as described above.

Thus, the interior structure 10 of the present invention includes the collapsible frame 14 that, in the collapsed state, can be easily carried into a mobile platform by one or two persons through a typical man-door. The collapsible frame can then be expanded, positioned and connected to the mobile platform without the used of heaving moving or lifting equipment. The interchangeable panels 134 can then be attached to the expanded collapsible frame 14 to form a completed interior structure 10. Therefore, interior structure 10 provides a mobile platform interior structure constructed to allow the structure to be easily installed after body join of the mobile platform, without the use of heavy moving or lifting equipment, and just as easily removed at a later time.

While the invention has been described in terms of various specific embodiments, those skilled in the art will recognize that the invention can be practiced with modification within the spirit and scope of the claims.

What is claimed is:

1. An interior structure for a mobile platform, said structure comprising:
    a lightweight collapsible frame configured to expand to form at least a portion of a structural load bearing frame for a mobile platform interior structure, the frame including:
        a pair of folding end sections that each include a folding top rail and a folding bottom rail fixedly coupled to a pair of end rails; and
        at least a pair of side sections that each include a top rail and a bottom rail fixedly coupled to a pair of end rails, and at least one racking rail diagonally connected between the respective side section top rail and bottom rail, the side section end rails longitudinally hingedly connected to the end rails of the folding end sections; and
    a plurality of panels configured to be interchangeably and removably attachable to each of the folding end sections and each of the side sections independently.

2. The structure of claim 1, wherein each of the panels comprises a plurality of positionable connectors such that each panel is interchangeable with the other panels and connectable to any of the folding end sections and the side sections.

3. The structure of claim 1, wherein the panels are configured to provide wall panels of the structure.

4. The structure of claim 1, wherein the panels are configured to provide floor panels of the structure.

5. The structure of claim 1, wherein the panels are configured to provide ceiling panels of the structure.

6. The structure of claim 1, wherein the panels are configured to provide interior functional wall furnishings of the structure.

7. The structure of claim 1, wherein the frame sections are hingedly connected such that the frame sections can be folded together to place the collapsible frame in a compact, substantially flat collapsed state.

8. The structure of claim 7, wherein the collapsible frame is configured to pivot along the hinged connections to unfold the frame sections thereby placing the collapsible frame in an expanded state to create the load bearing frame.

9. The structure of claim 7, wherein the frame sections comprise trusses.

10. The structure of claim 8, wherein the structure further comprises a cross beam configured to couple at opposing ends to bottom rails of the collapsible frame when the collapsible frame is in the expanded state.

11. A mobile platform, comprising:
    an interior structure including:
        a lightweight collapsible frame configured to expand from a compact, substantially flat collapsed state to an expanded state that provides at least a portion of a structural load bearing frame for the interior structure, the frame including:
            a pair of folding end sections that each include a folding top rail and a folding bottom rail fixedly coupled to a pair of end rails; and
            at least a pair of side sections that each include a top rail and a bottom rail fixedly coupled to a pair of end rails, and at least one racking rail diagonally connected between the respective side section top rail and bottom rail, the side section end rails longitudinally hingedly connected to the end rails of the folding end sections; and
        a cross beam configured to couple at opposing ends to a center portion of opposing folding end section bottom rails and the side section bottom rails of the collapsible frame when the collapsible frame is in the expanded state; and
        a plurality of panels configured to be interchangeably and removably attachable to each of the folding end sections and each of the side sections independently.

12. The mobile platform of claim 11, wherein the panels are configured to provide at least one of wall panels of the interior structure, floor panels of the interior structure, ceiling panels of the interior structure and interior furnishings of the interior structure.

13. The mobile platform of claim 11, wherein the frame sections are hingedly connected such that the frame sections can be folded together to place the collapsible frame in the collapsed state and pivoted along the hinged connections to unfold the frame sections thereby placing the collapsible frame in the expanded state.

14. The mobile platform of claim 13, wherein the frame sections comprise trusses.

15. The mobile platform of claim 11, wherein the interior structure comprises a mobile platform privacy cabin.

16. The mobile platform of claim 11, wherein each of the panels comprises a plurality of positionable connectors such that each panel is interchangeable with the other panels and connectable to any of the folding end sections and the side sections.

* * * * *